United States Patent

Thomas

[19]

[11] Patent Number: 5,851,415
[45] Date of Patent: Dec. 22, 1998

[54] SNOW MOLD

[76] Inventor: Larry G. Thomas, 10S330 Palisades Rd., Hinsdale, Ill. 60521

[21] Appl. No.: 856,516

[22] Filed: May 15, 1997

[51] Int. Cl.⁶ ..................................................... B28B 7/024
[52] U.S. Cl. ......................... 249/117; 249/121; 249/126; 249/170; 425/DIG. 57; 446/73
[58] Field of Search .......................... 425/DIG. 57, 811; 249/121, 170, 171, 126, 117, 160; 264/132; 426/383; 446/79, 71, 72, 73, 75, 76

[56] References Cited

U.S. PATENT DOCUMENTS

| | | | |
|---|---|---|---|
| Re. 28,068 | 7/1974 | Lemelson | 264/132 |
| 3,059,279 | 10/1962 | Rossi | 249/170 |
| 4,164,341 | 8/1979 | McComb | 249/126 |
| 4,725,036 | 2/1988 | Brandon et al. | 249/170 |
| 5,632,926 | 5/1997 | Dyer, Jr. et al. | 249/170 |

FOREIGN PATENT DOCUMENTS 682874  10/1939  Germany ................................ 101/114

*Primary Examiner*—Jay H. Woo
*Assistant Examiner*—Robert Hopkins
*Attorney, Agent, or Firm*—Dillis V. Allen

[57] ABSTRACT

A decorative holiday figurine convertible by the consumer to a snow mold for molding snow into shapes conforming to the interior of the figurine. The figurine is manufactured so the consumer can remove portions of the figurine for loading snow and separating the figurine into hinged halves so the mold can be removed after snow molding is complete. The figurine has an associated colorant system that allows the snow molder to inject colorant in selected areas through the mold.

14 Claims, 3 Drawing Sheets

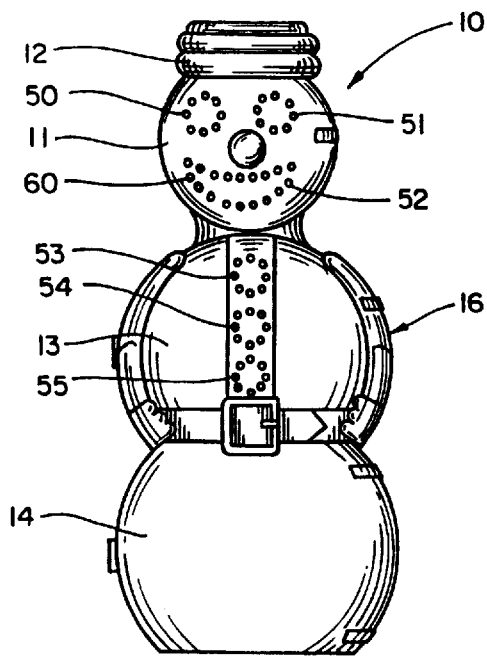
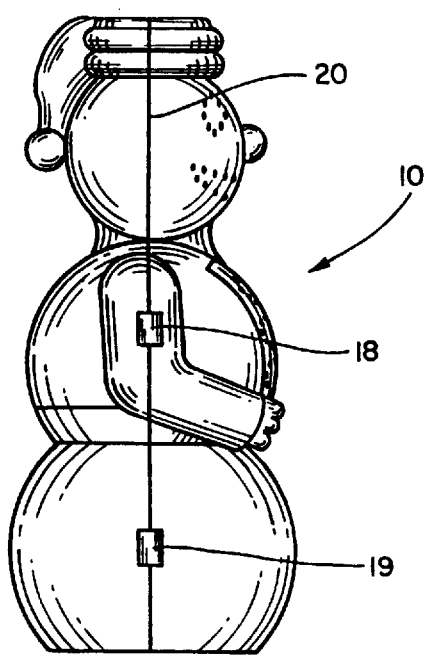
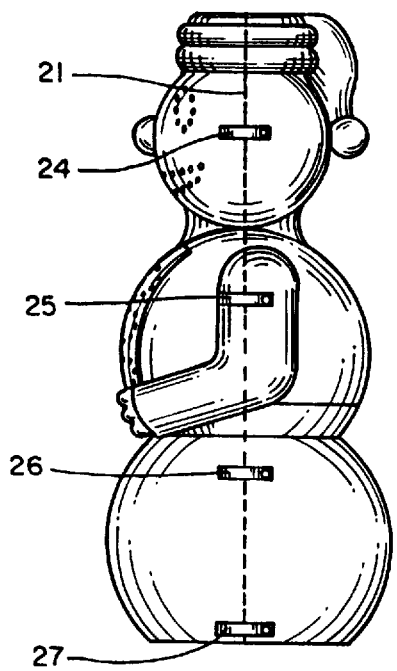
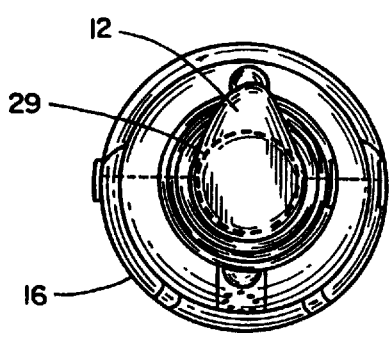

SNOW MOLD

BACKGROUND OF THE DISCLOSURE

There have, in the past, been provided molds that are splitable in halves.

The Rossi, U.S. Pat. No. 3,059,279; the McComb, U.S. Pat. No. 4,164,341, and the Brandon, et al., U.S. Pat. No. 4,725,036, all show vertically split molds for forming snow figures and particularly snowmen. The McComb Patent shows a plurality of additional apertures 36 and 37 in the middle and lower sections of the mold halves to facilitate loading.

The Cunningham, U.S. Pat. No. 1,170,049; the Detjen, U.S. Pat. No. 2,352,083; the Sherbloom, U.S. Pat. No. 2,939,299; the Williams, U.S. Pat. No. 3,144,699; the Lemelson, U.S. Pat. No. 3,332,658; the Hasselbach, U.S. Pat. No. 3,788,590; the Greenberg, U.S. Pat. No. 3,989,220; the Noel, U.S. Pat. No. 4,669,271; the Parmacek, et al., U.S. Pat. No. 4,739,963, and the Tapang, U.S. Pat. No. 5,497,974, all show mold halves into which the molding material is loaded at low pressure, usually from the top, including those for making ice objects.

The Patesson, U.S. Pat. No. 878,308; the Clearwaters, et al., U.S. Pat. No. 3,598,358, and the Infanti, U.S. Pat. No. 4,971,737, all show molding techniques for applying colorant to the molded objects in the mold itself. The Infanti colorant technique includes layering ice layers of different colors in the mold as discussed in column 9 of the patent. The Clearwaters Patent depicts colorant changes in the mold by providing dividers within the mold itself, and the Patesson map molding technique includes a similar method.

The primary object of the present invention is to ameliorate the problems noted above in snow molding and to significantly improve upon these molding systems.

SUMMARY OF THE PRESENT INVENTION

In accordance with the present invention, a decorative plastic molded figurine is provided of the general type commonly used for holiday decorating, such as snowmen, bears, candles, soldiers, etc. These figurines are typically 2 to 5 feet in height, and are usually either vacuum formed or centrifically molded plastics. The figurine, according to the present invention, is convertible by the consumer, or their children, to a snow mold using a plurality of unique features. The figurine is perf-cut along one side permitting the consumer to cut or break open the figurine and open it about integrally molded hinges on the other side of the figurine, thereby converting the figurine to a mold. This permits the mold to be removed from the molding after snow compaction in the mold. An upper portion of the figurine has a generally circular perf-cut that enables the consumer to knock out a disk in the figurine top surface at a size and location suitable for loading snow into the mold and compacting the snow into the mold.

An important aspect of the present invention is the provision of a colorant system that enables the consumer to add a variety of colors to certain specific areas of the snow molding, such as eyes, nose, hats, buttons, etc. Toward this end, the colorant system includes a plurality of small apertures in the mold itself that permit a colorant to be injected with a colorant syringe, which is part of a set containing a plurality of different colors.

Other objects and advantages will appear from the following detailed description of the present invention.

BRIEF DESCRIPTION OF THE DRAWINGS

FIG. 1 is a front view of a figurine-snow mold according to the present invention;

FIG. 2 is a left side view of the figurine-snow mold illustrated in FIG. 1;

FIG. 3 is a right side view of the figurine-snow mold illustrated in FIGS. 1 and 2;

FIG. 4 is a top view of the figurine-snow mold illustrated in FIGS. 1 to 3;

DETAILED DESCRIPTION OF THE PREFERRED EMBODIMENT

Figure 5:
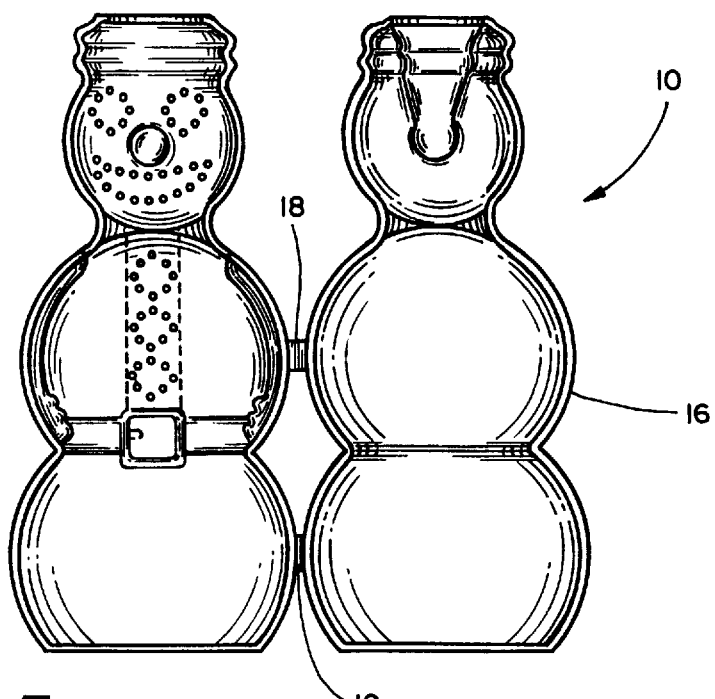
FIG. 5 is a view of the figurine-snow mold illustrated in FIGS. 1 to 4 after separation and opening.

Referring to the drawings, a figurine 10 is illustrated that is exemplified in the configuration of a snowman. However, it should be understood that the principles of the present invention are not limited to figurines or molds for molding snowmen, and they can take the form of a variety of other figurines, such as animals, soldiers, candles, etc., and that the present drawings which illustrate the figurine as a snowman do so for the purpose of example only.

The figurine 10 is a thin wall, hollow shell as viewed in FIG. 5 in a split open configuration, and is in essence a one piece plastic molding that may be either vacuum molded or centrifically molded. And it should be understood that the figurine 10 is convertible to an openable split half mold illustrated in FIG. 5, without the addition of any parts other than those that are integrally molded with the figurine 10.

Figure 6:
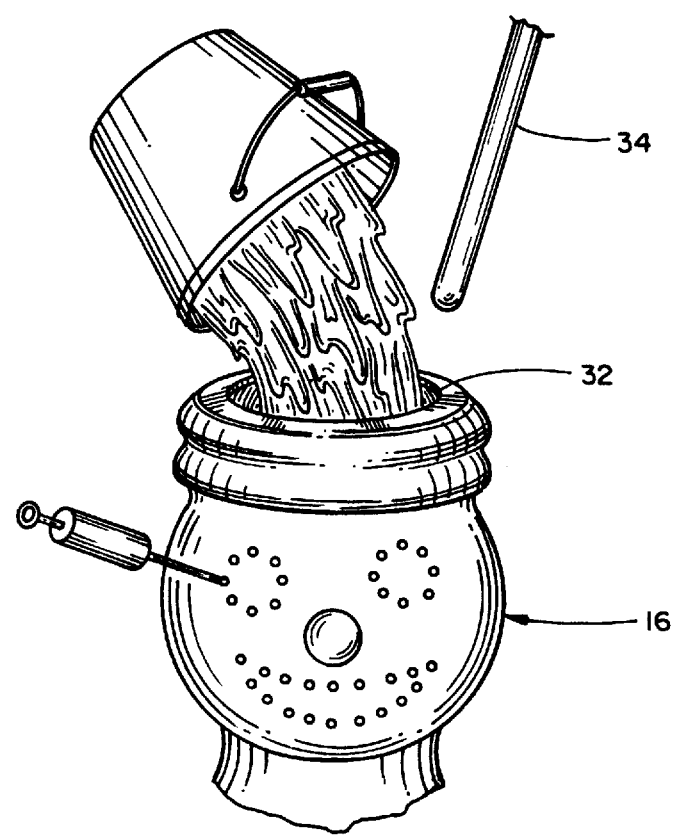
FIG. 6 is a perspective fragmentary view of an upper portion of the figurine-snow mold after removal of a perf-cut disk illustrating loading and compaction of the snow mold and insertion of the colorant therein.
Figure 7:
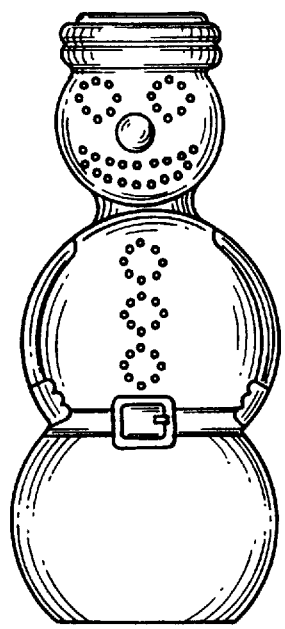
FIG. 7 is a front view of the molded snowman.

This capability enables the manufacturers of figurines commonly found in the marketplace today, with minor mold modifications, to market a figurine that is capable of being converted, if desired, by the consumer to a snow mold for molding an almost unlimited number of snow moldings from the figurine after conversion to the mold mode. Thus, without any additional cost, the present day figurine manufacturer can market a product that has an additional significant entertainment function with a marginal increase in mold making costs and with no increase in per part manufacturing costs, resulting in a product that is significantly more attractive to the consumer. That is, the homeowner or parent may purchase the figurine 10 for its own aesthetic value as a stand-alone decorative item either inside the house or outside the house either with or without internal lighting commonly found in such figurines today, and the consumer may at some later point in time cut open the figurine along one of its perf-cut sides and remove a top portion of the figurine as shown in FIG. 6 of the drawings to convert the figurine to a molding device. It should also be understood that after such a conversion, the mold can continue to be used as a decorative figurine apart from its molding function.

Toward these ends and as seen in the drawings, the present figurine 10 consists generally of a head portion 11 with a hat portion 12, a central body portion 13, and an integral lower portion 14, which are all either spherical or annular in configuration, but as noted above, the specific shape of the figurine is not an essential element of the present invention.

All of the portions 11, 12, 13 and 14 form a part of a single plastic mold 16 that has integral hinges 18 and 19 illustrated in FIG. 2 that are part of the molding and a separation line 20 that enables the mold 16 to be opened as illustrated in FIG. 5 about the hinges 18 and 19.

Toward these ends and as illustrated in FIG. 3, the opposite side of the mold 16 from the hinges 18 and 19 is perf-cut as illustrated along perf-cut line 21. The consumer can either tear or cut with a knife along the perf-cut line 21 to permit the mold 16 to be opened to the configuration illustrated in FIG. 5 for removal of the mold from the completed snow molding.

Integral straps 24, 25, 26, and 27 may be also integrally molded with the molding 16 eliminating the need for any additional parts.

As seen in FIG. 4, an upper portion of the mold 16, and in this case the top surface of the hat 12, has a circular perf-cut 29 that enables the consumer to knock open the top of the hat 12, or knock out a disk portion of the mold 16, that enables the hat to be converted to a circular opening 32 illustrated in FIG. 6 that enables snow to be dumped into the mold 16 when in the enclosed configuration shown in FIGS. 1 to 4. A similar perf-cut is in the bottom of the mold 16 so it may also be knocked out so the bottom of the mold is open to the ground so the molding can bond to the ground. While a pail is illustrated in FIG. 6, it should be understood that different size shovels could equally be employed to load snow into the mold 16.

Hole 34, shown in FIG. 6, is intended to illustrate the handle end of any one of a variety of outdoor tools that can be utilized to compact the snow within the molding 16.

After molding is complete, straps 24, 25, 26 and 27 are opened permitting the mold 16 to be opened to its configuration in FIG. 5 freeing it from the completed snow molding.

It is an important aspect of the present invention that a colorant system be provided to color very specific areas of the snow molding, and not others, with a variety of colorants. It should be understood that while this feature is particularly suitable for the figurine convertible mold technique described in accordance with the present invention, that it could be utilized with present day non-convertible snow molds.

Figure 8:
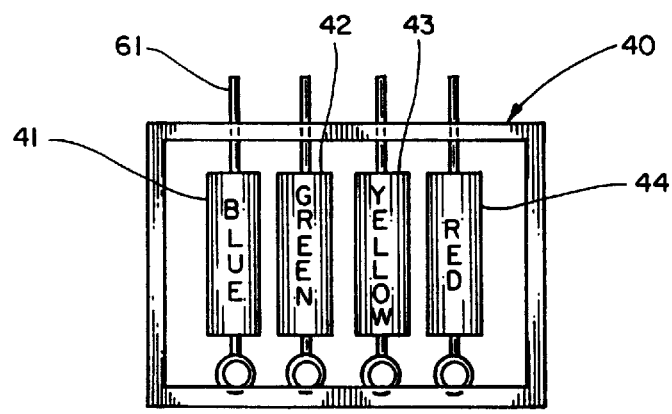
FIG. 8 is a view of the colorant syringe set usable in the present colorant system.

Toward this end, the colorant system, according to the present invention, includes first a set 40, illustrated in FIG. 8, of colorant syringes 41, 42, 43 and 44, each containing a different color such as blue, green, yellow and red. The system also includes, as seen in FIG. 8, a plurality of discreet colorant areas in the mold 16, such as areas 50 and 51 around the eyes of the snowman, 52 around the mouth of the snowman, and 53, 54 and 55 on the snowman buttons. It should be understood that other areas could be included as well and that the areas will, of course, be dictated not by whether they are eyes, mouths, and buttons but by the specific characteristics of the figurine intended to be highlighted by colors.

Each of the areas 50, 51, 52, 53, 54 and 55 is defined by a plurality of closely spaced apertures 60, each of which has a diameter slightly larger than the diameter of the outer tubes 61 of the colorant syringes 41, 42, 43 and 44.

After snow loading and snow compaction is completed, the snow molder selects one of the colorant syringes and injects a small amount of colorant through each of the apertures 60. There are a high number of apertures 60 in each of the colorant areas 50, 51, 52, 53, 54 and 55 so that only a small amount of colorant has to be injected in each aperture. This technique and construction provides the technology for well-defined colorant areas in the form of fairly straight lines as the colorant from one aperture merges into the colorant injected through another aperture in the snow mold itself.

I claim:

1. A combination decorative figurine and snow mold, comprising: a thin walled one-piece mold having the decorative shape of a character or figure and having an inner configuration similar to its outer configuration, said mold being constructed of a light-weight material so it may be easily transported, said mold including a first portion, a second portion separated from the first portion by a generally vertical plane with both formed with a single molding, means for converting the molding from a decorative figurine to a snow mold including means for opening the molding along the vertical plane, said means for opening the molding along the vertical lane including means for separating the mold on one side of the vertical plane along a generally vertical axis and means for hinging the mold on the other side of the vertical plane also along a generally vertical and spaced axis, said means for separating the mold along a generally vertical axis including a perf-cut in the molding along the axis.

2. A combination decorative figurine and snow mold as defined in claim 1, wherein the means for hinging the mold along a generally vertical and spaced axis includes hinge means molded integrally with the molding.

3. A combination decorative figurine and snow mold as defined in claim 1, including means providing an opening for loading snow in the molding including a removable portion of the molding at the upper end thereof.

4. A combination decorative figurine and snow mold as defined in claim 3, wherein the removable portion of the molding includes an enclosed perf-cut in the molding.

5. A combination decorative figurine and snow mold as defined in claim 1, including means for opening the base of the molding so snow impacted thereon may bond with the ground elements including a removable portion of the molding at a lower portion thereof.

6. A combination decorative figurine and snow mold as defined in claim 1, including means for inserting colorant through the mold into the snow impacted into the mold, said means for inserting colorant including a plurality of spaced feature areas to be decorated with colorant, each of the areas including a plurality of small holes through which colorant may be injected.

7. A combination decorative figurine and snow mold, comprising: a thin walled one-piece mold having the decorative shape of a character or figure and having an inner configuration similar to its outer configuration, said mold being constructed of a light-weight material so it may be easily transported, said mold including a first portion, a second portion separated from the first portion by a generally vertical plane with both formed with a single molding, means for converting the molding from a decorative figurine to a snow mold including means for opening the molding along the vertical plane, the means for opening the molding along the vertical plane including means for separating the mold on one side of the vertical plane along a generally vertical axis, and means for hinging the mold on the other side of the vertical plane along along a generally vertical and spaced axis, the means for separating the mold along a generally vertical axis includes a perf-cut in the molding along the axis, and the means for hinging the mold along a generally vertical and spaced axis includes hinge means molded integrally with the molding.

8. A combination decorative figurine and snow mold, comprising: a thin walled mold having the decorative shape of a character or figure and having an inner configuration similar to its outer configuration, said mold being constructed of a light-weight material so it may be easily transported, said mold including a first portion, a second portion separated from the first portion by a generally vertical plane with both formed with a single molding, means for converting the molding from a decorative figurine to a snow mold including means for opening the molding along the vertical plane, the means for opening the molding along the vertical plane including means for separating the mold on one side of the vertical plane along a generally vertical axis, means for hinging the mold on the other side of the vertical plane along along a generally vertical and spaced axis, the means for separating the mold along a generally vertical axis includes a perf-cut in the molding along the axis, the means for hinging the mold along a generally vertical and spaced axis includes hinge means molded integrally with the molding, and means for inserting colorant through the mold into the snow impacted into the mold, said means for inserting colorant including a plurality of spaced feature areas to be decorated with colorant, each of the areas including a plurality of small holes through which colorant may be injected.

9. A combination decorative figurine and snow mold, comprising: a thin walled one-piece mold having the decorative shape of a character or figure and having an inner configuration similar to its outer configuration, said mold being constructed of a light-weight material so it may be easily transported, said mold including a first portion, a second portion separated from the first portion by a generally vertical plane with both formed with a single molding, means for converting the molding from a decorative figurine to a snow mold including means for opening the molding along the vertical plane, means providing an opening for loading snow in the molding including a removable portion of the molding at the upper end thereof, the removable portion of the molding including an enclosed perf-cut in the molding, and means for opening the base of the molding so snow impacted thereon may bond with the ground elements including a removable portion of the molding at a lower portion thereof.

10. A combination decorative figurine and snow mold, comprising: a thin walled mold having the decorative shape of a character or figure and having an inner configuration similar to its outer configuration, said mold being constructed of a light-weight material so it may be easily transported, said mold including a first portion, a second portion separated from the first portion by a generally vertical plane with both formed with a single molding, means for converting the molding from a decorative figurine to a snow mold including means for opening the molding along the vertical plane, means providing an opening for loading snow in the molding including a removable portion of the molding at the upper end thereof, the removable portion of the molding including an enclosed perf-cut in the molding, means for opening the base of the molding so snow impacted thereon may bond with the ground elements including a removable portion of the molding at a lower portion thereof, and means for inserting colorant through the mold into the snow impacted into the mold, said means for inserting colorant including a plurality of spaced feature areas to be decorated with colorant, each of the areas including a plurality of small holes through which colorant may be injected.

11. A snow mold for molding snow figures, comprising: a thin walled mold constructed of a light-weight material having an outer configuration substantially similar to the inner configuration, said mold having a snow entry opening near an upper portion thereof, said mold having a base opening at a lower portion thereof so the snow figure can bond to a ground surface, and means in the mold for permitting colorant to be inserted through the mold into selective areas representing the desired color graphics on the snow figure, said means for inserting colorant including a plurality of spaced feature areas to be decorated with colorant, each of the areas including a plurality of small holes through which colorant may be injected.

12. A snow mold for molding snow figures as defined in claim 11, including an injector for inserting the colorant through the apertures.

13. A snow mold for molding snow figures as defined in claim 11, wherein the mold is convertible from a decorative figurine to a snow mold, said mold being constructed of a light-weight material so it may be easily transported, said mold including a first portion, a second portion separated from the first portion by a generally vertical plane with both formed with a single molding, and means for converting the molding from a decorative figurine to a snow mold including means for opening the molding along the vertical plane.

14. A snow mold for molding snow figures, comprising: a thin walled mold constructed of a light-weight material having an outer configuration substantially similar to the inner configuration, said mold having a snow entry opening near an upper portion thereof, said mold having a base opening at a lower portion thereof so the snow figure can bond to a ground surface, and means in the mold for permitting colorant to be inserted through the mold into selective areas representing the desired color graphics in the mold and on the snow figure, the means permitting colorant to be inserted through the mold including a plurality of apertures in a plurality of different feature areas on the mold, each of the areas defining a recognizable part of the snow figure desired to be produced, the mold being convertible from a decorative figurine to a snow mold, said mold being constructed of a light-weight material so it may be easily transported, said mold including a first portion, a second portion separated from the first portion by a generally vertical plane with both formed with a single molding, and means for converting the molding from a decorative figurine to a snow mold including means for opening the molding along the vertical plane.

\* \* \* \* \*